Aug. 11, 1959  E. J. WELLAUER  2,899,038
CLUTCH
Filed Aug. 5, 1954
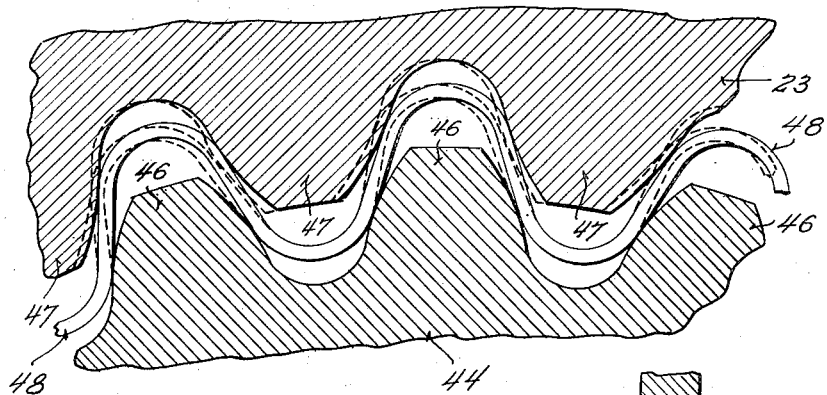
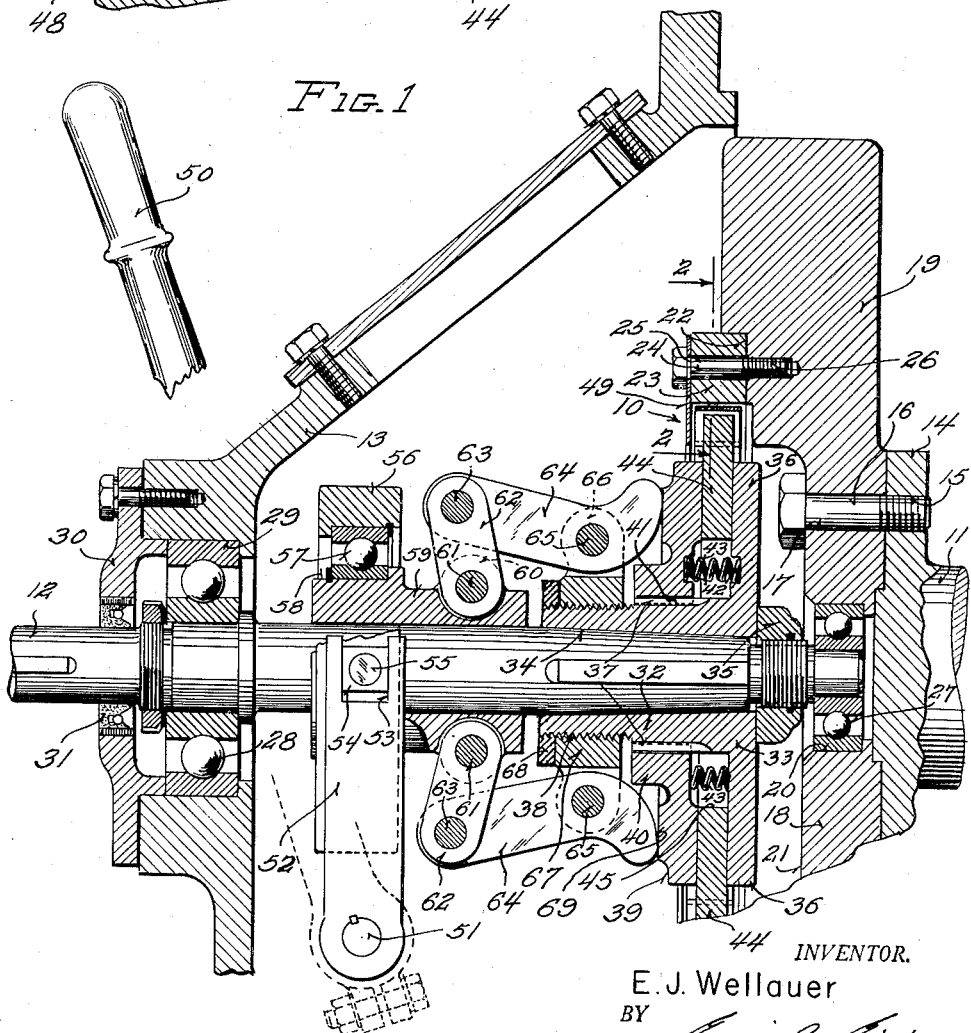
INVENTOR.
E. J. Wellauer
BY
ATTORNEY United States Patent Office 2,899,038
Patented Aug. 11, 1959

2,899,038

CLUTCH

Edward J. Wellauer, Wauwatosa, Wis., assignor to The Falk Corporation, Milwaukee, Wis., a corporation of Wisconsin Application August 5, 1954, Serial No. 447,967

4 Claims. (Cl. 192—68)

This invention relates to clutches and more particularly to those of the disc type in which a yieldable grid element is interposed between teeth formed on cooperating portions of either the driving or driven element of the clutch.

The majority of the conventional disc clutches of the type having teeth formed on cooperating portions of either the driving or driven element of the clutch have not proved entirely satisfactory for one of the number of reasons. The use of direct tooth to tooth contact between the cooperating portions of either the driving or driven element of the clutch presents several problems. One of these problems in this type of clutch concerns the formation of the meshing teeth to render them capable of accommodating any inherent misalignment between the driving and driven shafts between which the clutch is interposed. Another problem in this type of clutch relates to the formation of the meshing teeth in a manner which provides sufficient strength to absorb shock loads without resultant damage to the teeth.

The primary object of the present invention resides in the provision in a disc clutch having cooperating toothed portions formed either on the driving or driven element of the clutch of a yieldable grid element interposed between the teeth to form a yieldable connection adapted to compensate for inherent misalignment between the driving and driven shafts of the transmission and provide a yieldable shock absorbing or dampening means for loads imposed upon the teeth resulting from the transmission of power through the clutch.

Another object of the invention resides in the provision in a disc clutch having cooperating tooth portions formed on either the driving or driven element of the clutch of a yieldable corrugated grid element interposed between the teeth to provide a yieldable means to alter the position of the load transmitting contact between the respective teeth and an interposed yieldable corrugated grid element.

Another object of the present invention resides in the provision in a disc clutch having cooperating tooth portions formed on either the driving or driven element of the clutch of a yieldable ribbon-like grid element of corrugated form having an inner and an outer surface adapted for line contact with the faces of the adjacent teeth formed on the cooperating portions of either the driving or driven element of the clutch.

Another object of the invention resides in the provision of a disc clutch having cooperating tooth portions formed on either the driving or driven element of the clutch of a yieldable corrugated grid element positioned between the teeth formed on the cooperating portions of either the driving or driven element of the clutch whereby the application of a torque load upon the yieldable corrugated grid element results in its deflection to dampen shock loads resulting from the transmission of power through the clutch.

Other objects and advantages will become apparent from the following description of an illustrative embodiment of the present invention.

In the drawing:

Figure 1 is a vertical longitudinal sectional view of a disc type clutch constructed in accordance with the teachings of the present invention; and Fig. 2 is an enlarged vertical sectional view, taken on the line 2—2 of the Fig. 1, showing the relationship between the yieldable grid element and the teeth formed on the cooperating portions of either the driving or driven element of the clutch.

The clutch embodying the teachings of the present invention is so arranged that power may be transmitted through it in either direction with equal facility.

For the purpose of simplifying the description of the invention, it is to be understood that either one of the cooperating clutch elements may be considered as the driving element with the remaining one the driven element. It is also to be understood that the clutch of the present invention may be interposed between the driving and driven shafts of any transmission to provide a releasable driving connection between them.

Referring more particularly to Fig. 1, it will be noted that in the embodiment of the present invention chosen for illustrative purposes, the clutch 10 is interposed between a power input shaft 11 and a power output shaft 12 of any desired transmission. In the present instance, the power input shaft 11 of the transmission may be considered to be the crank shaft of a prime mover and the power output shaft 12, projecting from a suitable housing 13, provides a means for driving the remainder of the transmission.

The power input shaft 11 includes a flange portion 14 provided with a series of circumferentially arranged axially disposed threaded holes 15 (one of which is shown) for the receipt of cap screws 16 which pass through suitable bores 17 formed in a hub portion 18 of a fly wheel 19 on the flange 14 of the power input shaft 11. The fly wheel 19 includes a central axially disposed bearing receiving bore 20, a contiguous recess 21 adapted to house the head portions of the cap screws 16 and a larger contiguous annular recess 22 within which either a continuous or segmental ring member 23 is releasably retained by the application of cap screws 24 (one of which is shown) passing through circumferentially spaced axially aligned bores 25 formed in the ring member 23 and threaded bores 26 formed in the fly wheel 19.

The power output shaft 12 has one of its ends journaled in an anti-friction bearing 27 housed within the bearing receiving bore 20 in the hub portion 18 of the fly wheel 19. An intermediate portion of the power output shaft 12 is similarly journaled in an anti-friction bearing 28 retained in a shouldered recess 29 formed in the housing 13. A cover plate 30 forms a closure for the recess 29 in the housing 13 and is provided with a suitable oil seal 31 which serves to prevent leakage of lubricant from the housing 13.

The disc clutch 10, embodying the present invention, includes an element 32 having a hub portion 33 including a central axially disposed bore 34 provided with a keyway (not shown) adapted to cooperate with a key projecting from a keyway formed in the power output shaft 12 of the clutch 10 for the purpose of retaining the element 32 in fixed relationship with respect to the power output shaft 12 of the transmission. A retaining nut 35 may be applied to the threaded end portion of the power output shaft 12 to releasably retain the element 32 in proper position upon the power output shaft 12 of the transmission. An outwardly projecting flange 36 is formed at one end of the hub 33. The intermediate portion of the hub 33 is provided with splines 37 and the other extremity of the hub is provided with an externally threaded portion 38 for purposes to be hereinafter more specifically described. A movable clutch plate 39 having a diameter substantially equal to that of the circular flange 36 formed on the element 32 includes a hub portion 40 provided with a centrally disposed axial splined bore 41 which is slidably receivable for axial movement on the splines 37 formed on the hub portion 33 of the element 32. The inner surfaces of the flange 36 and the clutch plate 39 are respectively provided with a series of circumferentially disposed recesses or indentations 42 adapted to receive the respective ends of compression springs 43 which normally tend to urge the adjacent faces of the flange 36 and clutch plate 39 away from each other.

A clutch disc 44 having a central bore 45 of sufficient diameter to surround the series of compression springs 43 is adapted for positioning between the adjacent faces of the flange 36 and the clutch plate 39. The peripheral surface of the clutch disc 44 is provided with a series of circumferentially spaced teeth 46 which are adapted upon axial movement of the disc 44 to be positioned in cooperating spaced relationship with a similar series of internal teeth 47 formed on the inner marginal surface of the continuous or segmental ring 23 which is secured in the recess 22 of the fly wheel 19.

A yieldable grid element 48 preferably made of steel and having a corrugated ribbon-like form is adapted for slidable positioning between the adjacent teeth 46 and 47 formed respectively on the clutch disc 44 and the continuous or segmental ring 23. The outer surface of the yieldable grid element 48 is adapted for contact with the teeth 47 formed on the ring element 23 and the inner surface of the element 48 is adapted for contact with the teeth 46 formed on the clutch disc 44. It will be noted from reference to Fig. 2 of the accompanying drawing that the yieldable ribbon-like corrugated element 48 is accommodated and housed within the space which lies between the adjacent teeth 46 and 47 in a manner which precludes contact between the adjacent teeth of the clutch disc and ring. A retaining ring 49, held in position on the continuous or segmental ring 23 by screws 24, serves to maintain the yieldable grid element 48 against outward axial movement to retain it in proper relationship between the adjacent teeth 46 and 47 formed respectively on the clutch disc 44 and the continuous or segmental ring 23.

The yieldable grid element 48 disposed in the space between and in contact with the adjacent teeth 46 and 47 of the clutch disc 44 and ring 23 serves multiple purposes. It provides a means by which any misalignment between the power input shaft 11 and power output shaft 12 of the transmission is automatically compensated for by the movable positioning of the element 48 between the teeth 46 and 47. A further purpose of the yieldable grid element 48 is to provide a means for absorbing or dampening shock loads imposed upon the clutch resulting from the operation of the transmission. Another purpose of the yieldable grid element 48 is to provide a yieldable means whereby the distance between the lines of contact between the outer and inner surfaces of the element 48 and the adjacent teeth 46 and 47 is varied under varying load conditions of the transmission.

The relative position between the teeth 46 and 47 and the yieldable grid element 48 illustrated in full lines in Fig. 2 of the drawing shows the unstressed or normal load-free position of the grid element 48 with respect to the teeth 46 and 47 wherein the respective lines of contact between the outer and inner surfaces of the grid element 48 and the respective teeth 47 and 46 of the ring 23 and clutch disc 44 are relatively remote from each other.

Upon the engagement of the clutch and the application of a load thereon there will be relative movement between the adjacent teeth 46 and 47 formed on the respective cooperating portions of the driving element of the clutch shown diagrammatically by dotted lines in Fig. 2. Referring to this dotted line showing, it will be noted that the pressure exerted by the teeth 47 on the yieldable element 48 causes the deflection of the element 48 and the simultaneous movement of the lines of contact between the respective outer and inner surfaces of the grid element 48 with the teeth 46 and 47 to move toward each other under the stress of the load imposed upon the clutch. As the load imposed upon the yieldable grid element is relieved, the grid element will return to its normal unstressed position as shown in the full lines of Fig. 2. By reason of the yieldable and deflectable nature of the element 48, it will readily be understood that all shock loads impressed upon the clutch are assimilated by the yieldable element 48 in a manner to preclude either serious wear or injury to the teeth 46 and 47.

Any suitable means may be provided for effecting the engagement or disengagement of the clutch 10. In the present instance I have chosen to utilize a manually operable mechanical means for this purpose. A clutch actuating handle 50 is fixedly mounted on a rock shaft 51 journaled in suitable bearing (not shown) in the housing 13. A yoke 52 is fixedly mounted on the rock shaft 51 and includes a pair of diametrically arranged slots 53 adapted to slidably receive journal blocks 54 provided with axially aligned bores for receiving stub shafts 55 projecting outwardly from a ring element 56 provided with an anti-friction bearing 57 adapted to receive a shouldered portion 58 of an axially moveable clutch operating spool 59 mounted on the power output shaft 12. The clutch actuating spool is provided with a pair of diametrically positioned spaced ears 60 which carry pivot pins 61 on which one end of connecting links 62 are rockably mounted. Similar pivot pins 63 disposed adjacent the opposite end of the links 62 serve as a mounting means for one end of levers 64. The intermediate portion of the levers 64 is rockably mounted on a pivot pin 65 disposed between a pair of laterally spaced ears 66 projecting outwardly from an internally threaded collar 67 adapted to be applied to the threaded portion 38 of the element 32 of the clutch 10 and retained in desired position of adjustment thereon by the application of a lock nut 68. The free end of each of the levers 64 includes a cam surface 69 adapted to be retained in constant contact with the outer surface of the clutch plate 39 under the action of the coil springs 43 interposed between the flange portion 36 of the element 32 and the clutch plate 39.

The movement of the clutch operating handle 50, or any other suitable actuating means effects the selective engagement or disengagement of the clutch by the relative movement between the clutch plate 39 and the flange 36 by compressing or relieving pressure upon the coil springs 43 to either establish or relieve the frictional driving connection between the faces of the clutch disc 44 and the adjacent faces of the clutch plate 39 and the flange 36. In the present instance, the clutch 10 is engaged by rocking the handle 50 in a counterclockwise direction and is disengaged by rocking the handle 50 in a clockwise direction.

From the foregoing description, assuming that the shaft 11 comprises a power input for the transmission, it will readily be understood that the shaft 11, fly wheel 19, continuous or segmental ring 23, yieldable grid element 48, and the clutch disc 44 rotate as a unit at all times. When the clutch 10 is disengaged, and the portions 36 and 39 of the cooperating clutch element 32 are retained out of frictional contact with the faces of the clutch disc 44 the unitary rotation of the previously described elements is an idle one. When the clutch operating handle 50 is rocked in a counterclockwise direction it effects movement of associated elements to exert pressure upon the outer face of the clutch plate 39 to effect axial movement of the same to frictionally engage the clutch disc 44 between it and the inner face of the flange 36 to establish a driving relationship between the driving and driven elements of the clutch.

As previously stated, the yieldable grid element 48 which is positioned in the space between the toothed portions 46 and 47 of the clutch disc 44 and the continuous or segmental ring 23 is arranged for self-positioning in a manner to compensate for any misalignment between the power input shaft 11 and the power output shaft 12.

Upon the engagement of the clutch 10, the starting load of the previously idle portion of the transmission is impressed upon the clutch 10 substantially instantaneously and it is at this point particularly that the yieldable nature of the grid element 48 comes into play to effectively absorb and dampen the shock load in a manner to preclude both wear and damage to the teeth 46 and 47 between which the element 48 is interposed. The deflectable nature of the yieldable grid element 48 serves to cushion the shock loads impressed upon it and the teeth 46 and 47 and the amount of its deflection is in direct proportion to the magnitude of the load. As motion of the driven portion of the transmission is accelerated, the load upon the yieldable grid element 48 is relieved and the element tends to return to its normal unstressed position.

From the foregoing description, it will be apparent that a new and improved disc clutch has been provided wherein a yieldable grid element is interposed between cooperating toothed portions of either the driving or driven element of the clutch to provide a simple and effective means for compensating for misalignment between the driving and driven shafts of the transmission and also providing a deflectable means capable of absorbing or dampening shock loads imposed upon the clutch and prevent damage to the teeth formed on the cooperating portions of either the driving or driven element of the clutch.

While the invention has been described in considerable detail in the foregoing description, it is to be understood that various changes may be made in its embodiment without departing from or sacrificing any of the advantages hereinafter claimed.

I claim:

1. In a clutch the combination of relatively axially movable driving and driven members for respective attachment to the power input and output shafts of the transmission, one of said members comprising a pair of cooperating portions including a fixedly positioned internally toothed ring, an externally toothed disc having a width substantially less than that of said internally toothed ring, a yieldable annular ribbon-like corrugated element having an outer diameter less than the root diameter of the teeth on said ring and an inner diameter greater than the root diameter of the teeth on said disc, said element being interposed between the respective teeth of said ring and disc and having line contact with the sides only of said teeth to form a driving connection therebetween, said yieldable element having a width substantially the same as that of said internally toothed ring and being self positioning between the teeth of said ring and disc to automatically compensate for misalignment between the driving and driven shafts of the transmission, retaining means on said internally toothed ring to maintain said yieldable element in position between the teeth of said ring and said disc, and actuating means operative to effect the selective engagement or disengagement of said members.

2. In a clutch the combination of relatively axially movable driving and driven members for respective attachment to the power input and output shafts of the transmission, one of said members comprising a pair of cooperating portions including a fixedly positioned internally toothed ring, an externally toothed disc having a width substantially less than that of said internally toothed ring, a yieldable annular ribbon-like corrugated element having an outer diameter less than the root diameter of the teeth on said ring and an inner diameter greater than the root diameter of the teeth on said disc, said element being interposed between the respective teeth of said ring and disc to form a driving connection therebetween, said yieldable element having a width substantially the same as that of said internally toothed ring and being deflectable to dampen shock loads imposed upon the clutch, retaining means on said internally toothed ring to maintain said yieldable element in position between the teeth of said ring and said disc, and actuating means operative to effect the selective engagement or disengagement of said members.

3. In a clutch the combination of relatively axially movable driving and driven members for respective attachment to the power input and output shafts of a transmission, one of said members comprising a pair of relatively axially movable plate portions and the other of said members comprising a pair of cooperating members including an externally toothed disc portion disposed between said plate portion and a fixedly positioned internally toothed ring portion surrounding said toothed disc portion, said disc portion having a width substantially less than said ring portion and being disposed in nested relationship therewith to delineate a space between the adjacent teeth of said portions, a yieldable annular corrugated ribbon-like grid element having an outer diameter less than the root diameter of the teeth on said ring and an inner diameter greater than the root diameter of the teeth on said disc and having a width substantially equal to that of said ring, said yieldable annular corrugated ribbon-like grid element being interposed between the respective teeth of said ring and disc to compensate for misalignment between the power input and output shafts and yieldable under torque load to dampen shock loads impressed upon the toothed portions of said clutch, retaining means on said internally toothed ring to maintain said grid element in position between the teeth of said ring and said disc, and actuating means operable to selectively move said plate portions into and out of driving frictional contact with said disc portion.

4. In a clutch the combination of relatively axially movable driving and driven members for respective attachment to the power input and output shafts of a transmission, one of said members comprising a pair of relatively axially movable plate portions and the other of said members comprising a pair of nested cooperating members including an externally toothed disc portion disposed between said plate portions and a fixedly positioned internally toothed ring portion surrounding said toothed disc portion, said toothed ring portion having a width substantially greater than that of said disc, the teeth on said nested members being disposed in radial spaced relationship to delineate an undulating passage between the respective teeth of said nested members, a yieldable annular undulating ribbon-like torque transmitting grid element having an outer diameter less than the root diameter of the teeth on said ring and an inner diameter greater than the root diameter of the teeth on said disc, and a width substantially equal to that of said internally toothed ring, said element being disposed within the undulating passage formed by the cooperating relationship between the adjacent teeth of said nested members, the surfaces of said yieldable element maintaining constant line contact with the sides only of the teeth formed on the nested members and being self-positioning between them to compensate for misalignment of the power input and output shafts of the transmission and yieldable under torque to dampen shock loads impressed upon the toothed portions of said clutch, retaining means on said internally toothed ring to maintain said grid element in position between the teeth of said ring and disc, and actuating means operable to selectively move said plate portions into and out of driving frictional contact with said disc portion.

(References on following page)

References Cited in the file of this patent

UNITED STATES PATENTS

| | | |
|---|---|---|
| 1,017,819 | Sundh | Feb. 20, 1912 |
| 1,467,732 | Litle | Sept. 11, 1923 |
| 2,184,506 | Eason | Dec. 26, 1939 |
| 2,270,482 | Stolte | Jan. 20, 1942 |
| 2,402,897 | Kindig et al. | June 25, 1946 |
| 2,562,166 | Bendall | July 31, 1951 |
| 2,567,125 | Ruch | Sept. 4, 1951 |
| 2,575,765 | Nobstedt et al. | Nov. 20, 1951 |
| 2,737,033 | Bendall | Mar. 6, 1956 |
| 2,775,105 | Banker | Dec. 25, 1956 |